F. BÖLLING.
ELECTRIC COOKING VESSEL.
APPLICATION FILED NOV. 5, 1908.
920,906.
Patented May 11, 1909.
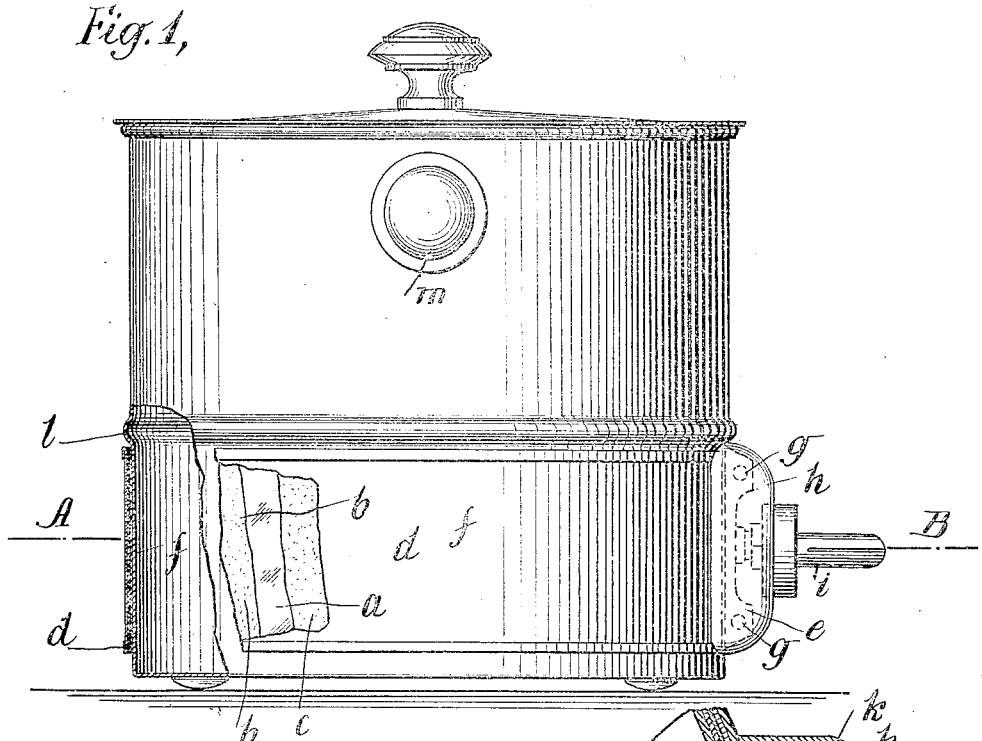
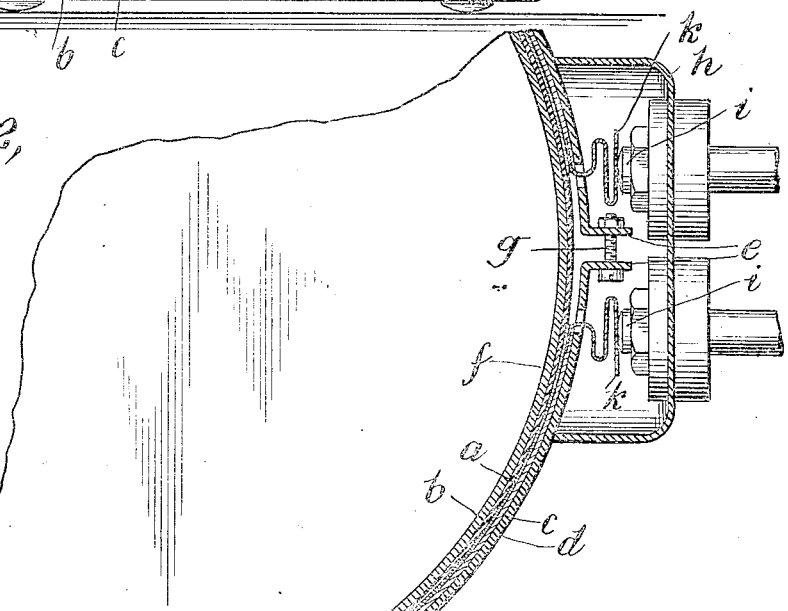
WITNESSES:
K. G. Leard
G. O. Gilmore
INVENTOR
Friedrich Bölling
BY
his ATTORNEY

UNITED STATES PATENT OFFICE.

FRIEDRICH BÖLLING, OF FRANKFORT-ON-THE-MAIN, GERMANY, ASSIGNOR TO THE PROMETHEUS ELECTRIC CO., OF NEW YORK, N. Y., A CORPORATION OF NEW YORK.

ELECTRIC COOKING VESSEL.

No. 920,906.  Specification of Letters Patent.  Patented May 11, 1909.

Application filed November 5, 1908. Serial No. 461,147.

*To all whom it may concern:*

Be it known that I, FRIEDRICH BÖLLING, a subject of the Emperor of Germany, residing at Frankfort-on-the-Main, Bockenheim, Germany, have invented a certain new and useful Improvement in Electric Cooking Vessels, of which the following is a specification.

This invention relates to electric cooking vessels and has for its object the production of such a vessel which shall be cheaper in construction, easier to repair and more effective and economical in use than any heretofore.

The electric cooking vessels now on the market may be divided into three classes; those in which the bottom is heated, those in which the heating is effected from the side and those in which the heating is effected from both the side and the bottom.

This invention has particular relation to that class in which only the side is heated. Vessels of this class comprise either an outer vessel and an inner vessel, which latter carries in its lower portion near the bottom or on its entire outside wall, heating strips, resistance wires or heating collars, or an outer vessel and an inner vessel in which the inner vessel is restricted near the bottom to form a sack adapted to receive the heating element. In this latter apparatus the outer vessel, which serves as a protection for the heating means on the inner vessel and also has the purpose of receiving the contact pins for the conducting wires, could be made considerably smaller than in the former apparatus and thus a considerable amount of material saved. Consequently, electric cooking utensils, the general introduction of which was prevented especially by their high prices, which depend for a large part on the necessity of double vessels, became cheaper and went into more general use. But even with this latter simplification, the price is high compared with the usual cooking utensils. Moreover, the heating sack was a necessary disadvantage, because the cylindrical cubic content of the vessel was thereby decreased and the cleaning of the vessel was rendered difficult. In both cases (use of a double vessel or a vessel with a sack) only a small space was left for arranging the heating elements, which can be arranged only near the lower edge. The comparatively small heating elements, therefore, in order to get sufficient heat had to be strongly loaded electrically and hence easily burn out. The load, for instance, in a pot having a content of one liter was 10 watts per square centimeter, whereas in a vessel as hereafter described as made according to this invention the load is only 6 watts per square centimeter, so that such latter vessel is, even with a high voltage, much less liable to burn out.

The object of the present invention is further to cheapen the cooking utensils and to facilitate their cleaning. This is effected by placing the heating means, for example, a heating ring, directly on the vessel, soldering the ring thereto and using a small contact box carrying suitable contact-pins for conducting the current.

In the following I have described, in connection with the accompanying drawings, one form of apparatus, embodying my invention, the features thereof being more particularly pointed out hereinafter in the claims.

In the drawings, Figure 1 is an elevation of a cooking vessel illustrating my invention and Fig. 2 is a cross sectional view along the line A—B of Fig. 1.

Similar letters indicate similar parts throughout the several views.

The heating element preferably consists of a layer of metal $a$ painted on a mica-plate $b$ and then fired (substantially as described and claimed in U. S. Patent No. 617,375 to Voight & Haeffner) to serve as a resistance, a second mica-plate $c$ covering the layer of metal $a$ and a sheet metal cover $d$ resting upon said mica-plate $c$, the ends $e, e$ of said sheet metal cover $d$ being outwardly turned as shown and clamped around vessel $f$ over the heating element proper by means of screw $g$ passing through the ends $e, e$ of the sheet metal cover $d$, whereby the heating element proper comprising the mica-plates $b, c$, with the layer of resistance $a$ is pressed against the vessel to be heated. The sheet metal cover $d$ in this case serves a double purpose, to press the heating element against the vessel and to protect the heating element from mechanical destruction. The contact box $h$ contains the adjustable contact-pins $i, i$ which are adapted to contact with conductors $k, k$ in electrical connection with resistance layer $a$. Contact box $h$ may be soldered to the lower edge of vessel $f$ and every plumber, therefore, can in a short time repair such a utensil and it does not need to be sent to the factory for that purpose, as is now the case. This advantage is of great importance for the reason that the vessels are often left loaded with the current and without containing any liquid, whereby the heating element becomes overheated and hence defective and must be exchanged. The repairing, which heretofore was very expensive, is considerably cheapened, because the sending of the cooking utensil to the factory and returning the same is no longer necessary. Time is also saved, and the easy exchange of the elements is of especial importance for the export trade.

As above stated, I prefer to solder the sheet metal cover or ring $d$ to the lower edge of the vessel $f$ as well as solder the contact box $h$ thereto. In the case of ring $d$ this is most conveniently done by extending the ring over the upper and lower edges of the mica strips and soldering such extension edges directly to the vessel. Beads $l, l$ may be provided to assist in holding the heating element in position and to provide a seat for the same. $m$ is a handle fastened to vessel $f$ in any convenient way.

Instead of the metal resistance described, round or flat heating wires of fine or other metals may be used. These heating wires should also be pressed tightly against the wall of the vessel as is the case with the element above described. The wires may be wound directly onto the pot, provided with a corresponding insulation and then covered and pressed by the collar-like tension strip or ring as described.

A cooking utensil as described, has the further advantage that when it is in circuit and not containing any liquid, the contact box may melt off, so that the heating element proper is not destroyed. The contact box can, in a short time, be soldered on again, so that the apparatus can again be used.

It is obvious that the construction and arrangement of parts may be varied without departing from the spirit of the invention and I do not restrict myself to the details shown.

What I claim and desire to secure by Letters Patent is:—

1. In an electric cooking vessel, a heating element placed directly on the vessel and a projecting strip soldered to said vessel over said element and insulated from said element.

2. In an electric cooking vessel, a resistance comprising a strip of liquid metal fired onto an insulating strip, a second insulating strip covering the fired liquid metal, a metallic ring covering said second insulating strip and means whereby said ring presses the other parts firmly against the wall of the vessel.

3. In an electric cooking vessel, a resistance, a metallic ring insulated from said resistance and adapted to press said resistance against the wall of the vessel and a contact box adapted to be soldered to the wall of the vessel and provided with contact-pins adapted to conduct current to said resistance.

In testimony whereof I have hereunto signed my name in the presence of two subscribing witnesses.

FRIEDRICH BÖLLING.

Witnesses:
JEAN GRUND,
CARL GRUND.